United States Patent
Shaw et al.

(10) Patent No.: US 10,891,344 B2
(45) Date of Patent: Jan. 12, 2021

(54) CONTENT DELIVERY SYSTEM

(71) Applicant: PIKSEL, INC., Wilmington, DE (US)

(72) Inventors: Philip Shaw, Yorkshire (GB); Hans-Jurgen Maas, Mainz (DE)

(73) Assignee: PIKSEL, INC., Wilmington, DE (US)

(*) Notice: Subject to any disclaimer, the term of this patent is extended or adjusted under 35 U.S.C. 154(b) by 320 days.

(21) Appl. No.: 15/523,079

(22) PCT Filed: Oct. 29, 2015

(86) PCT No.: PCT/EP2015/075160
§ 371 (c)(1),
(2) Date: Apr. 28, 2017

(87) PCT Pub. No.: WO2016/066761
PCT Pub. Date: May 6, 2016

(65) Prior Publication Data
US 2017/0316101 A1 Nov. 2, 2017

(30) Foreign Application Priority Data
Oct. 31, 2014 (GB) .................................. 1419476.5

(51) Int. Cl.
*G06F 16/00* (2019.01)
*G06F 16/9535* (2019.01)
(Continued)

(52) U.S. Cl.
CPC ........ *G06F 16/9535* (2019.01); *G06F 16/958* (2019.01); *G06Q 50/00* (2013.01)

(58) Field of Classification Search
CPC .... G06F 16/9535; G06F 16/958; G06Q 50/00
See application file for complete search history.

(56) References Cited

U.S. PATENT DOCUMENTS 9,680,959 B2 * 6/2017 Gargi .................. G06F 16/9535
2009/0249451 A1 10/2009 Su et al.
(Continued)

FOREIGN PATENT DOCUMENTS

WO  WO 2014/142890 A1  9/2014

OTHER PUBLICATIONS

International Search Report and Written Opinion, dated Jan. 12, 2016, European Patent Office.

*Primary Examiner* — Leslie Wong
(74) *Attorney, Agent, or Firm* — Holzer Patel Drennan

(57) ABSTRACT

There is disclosed a content delivery computer system arranged to recommend content items to a user of the system having at least one predetermined characteristic, the content delivery system comprising: a social media analyser configured to receive and analyse social media communications from multiple consumers; a grouping component for grouping at least some of the consumers according to the analysed social media communications into respective groups; and a recommendation module configured to receive the at least one predetermined characteristic of the user, compare it with group characteristics of the respective groups to identify a group that shares the at least one predetermined characteristic, and generate a recommendation comprising one of more selected content items for the user based on the identified group of consumers; and an interface for delivering the recommendation to the user.

20 Claims, 3 Drawing Sheets

(51) Int. Cl.
*G06F 16/958* (2019.01)
*G06Q 50/00* (2012.01)

(56) References Cited

U.S. PATENT DOCUMENTS

| | | | | |
|---|---|---|---|---|
| 2010/0088649 | A1* | 4/2010 | Kemp | G06Q 30/00 |
| | | | | 715/845 |
| 2012/0136723 | A1 | 5/2012 | Larner et al. | |
| 2014/0149206 | A1* | 5/2014 | Dubey | G06Q 30/0269 |
| | | | | 705/14.45 |
| 2014/0156681 | A1* | 6/2014 | Lee | G06F 16/9535 |
| | | | | 707/754 |
| 2014/0195921 | A1* | 7/2014 | Grosz | G06F 3/1242 |
| | | | | 715/738 |
| 2014/0359647 | A1* | 12/2014 | Shoemake | H04N 5/23206 |
| | | | | 725/10 |
| 2015/0070516 | A1* | 3/2015 | Shoemake | H04N 21/42203 |
| | | | | 348/207.11 |
| 2016/0055420 | A1* | 2/2016 | Karanam | G16H 50/20 |
| | | | | 700/52 |

\* cited by examiner

CONTENT DELIVERY SYSTEM

BACKGROUND TO THE INVENTION

Field of the Invention

The invention relates to a content delivery system. The invention is particularly concerned with controlling the recommendations to a user.

Description of the Related Art

The present application incorporates by reference all subject matter included in the following applications, which are identified by their official application number and the short title given to them to denote their subject matter as an internal designation:
U.S. 62/033,520—"Navigational Paradigm"
U.S. 62/033,445—"Context Driven Content"
U.S. 62/033,448—"Eco System"
U.S. 62/033,471—"Sequence of Delivery"
U.S. 62/033,473—"Swipe Based. Volume Control"
GB 1416052.7—"Wearables"
GB 1402534.0—"Crowd Based Content"
U.S. Ser. No. 14/179,704—"Editing-Historical Interaction"
U.S. Ser. No. 14/179,723—"Editing Current Interaction"

The first six cases listed above are referred to herein as the "Context-Based Recommendation" applications. Content display and delivery systems exist to provide users of computer devices with information and entertainment. Content comprises a large number of different kinds of presentation materials, including images and text. Content includes dynamic media such as weather and news updates, social media such as Twitter and Facebook, information such as email and entertainment such as video (both. Video on Demand VOD and Linear (broadcast channel LC)). It is increasingly problematic for a user to efficiently and successfully navigate their way through this vast proliferation of content to receive and view only that which is relevant to him. This is wasteful of a user's time and network resources, as well as local processing and storage resources. The recommendation cases listed above describe a content delivery system in which a content delivery server is configured to select from multiple content items a set of content items for display to a user at a user terminal, the content delivery server having access to content identifiers, identifying content items for delivery, the content delivery server comprising: a processor operating a content selection program which is arranged to receive the context data for different contexts and to select a set of content items in dependence on the context data, wherein the content items in the set may vary with the context data, such that the content of items in a first set for a user in a first context may be different from the content of items in a second set for the same user in a second context, and to transmit a recommendation message to a user terminal comprises a set of content identifiers.

Thus, according to this set of cases, it is generally disclosed that the context of a user can be used to enhance recommendations.

GB 1402534.0 (Crowd-Based Content) describes a recommendations engine which can determine one or more recommended media asset from a plurality of available media assets based on a combined group characteristic. The combined group characteristic is derived from processing the determined characteristics of each of a number of consumers in a group, where each consumer in the group has an association link with all other consumers in the group.

U.S. Ser. No. 14/179,704 (Editing-Historical Interaction) describes a content delivery system which can create a summary of a programme, or a range of programmes by identifying those pieces (clips) within the content of the programme or programmes that similar user's reacted positively to on social media.

SUMMARY OF THE INVENTION

In one aspect there is provided a content delivery computer system arranged to recommend content items to a user of the system having at least one predetermined characteristic, the content delivery system comprising: a social media analyser configured to receive and analyse social media communications from multiple consumers; a grouping component for grouping at least some of the consumers according to the analysed social media communications into respective groups; and a recommendation module configured to receive the at least one predetermined characteristic of the user, compare it with group characteristics of the respective groups to identify a group that shares the at least one predetermined characteristic, and generate a recommendation comprising one of more selected content items for the user based on the identified group of consumers; and an interface for delivering the recommendation to the user.

The grouping component may group all the consumers associated with determined relevant social media communications.

The grouping component may be configured to group the at least some consumers in dependence on an analysis of a message content associated with their social media communications.

The grouping component may be configured to group the at least some consumers in dependence on an analysis of their profile information.

The grouping component may be configured to group the at least some consumers in dependence on an analysis of metadata associated with their social media communications.

The content delivery system may further comprise a recommendation engine for receiving the recommendation.

The content delivery system may further comprise a recommendation engine including the recommendation module.

A server may comprise the content delivery system. The interface may be a network interface for connecting the server to a network which is in communication with a user terminal.

In another aspect there is provided a corresponding method, comprising a method of selecting content items to be delivered to a user of a content recommendation computer system, the user having at least one predetermined characteristic, the method comprising: receiving at the computer system social media communications from multiple consumers; using a social media analytic program component executing at the computer system to automatically analyse the social media communications using a grouping program component executing at the computer system to group the consumers according to the analysed social media communications into respective groups; storing in an electronic memory for each of the groups a set of group characteristics for that group; the computer system comprising the at least one predetermined characteristic of the user with the group characteristics to identify a group that shares the at least one predetermined characteristic and generating a recommendation comprising one or more selected content item for the user based on the identified group of consumers; and delivering a content identifier identifying the one or more content item to the consumer.

According to an example, there is provided a content delivery computer system arranged to select content items to deliver to a user of the system having at least one predetermined characteristic, the content delivery system comprising: a social media analyser configured to receive and analyse social media communications from multiple consumers; a grouping component for grouping the consumers according to the analysed social media communications not respective groups; and a recommendation engine having at least one input configured to receive the at least one predetermined characteristic of the user, to compare it with the respective groups; to generate a recommendation to select one or more content items based on updates from consumers in the group that share the least one predetermined characteristic; and an interface for delivering a content identifier identifying the one or more content item to the consumer.

Where the content delivery system is embodied at a server, the interface is a network interface for connecting the server to a network which is in communication with a device of the consumer. Where the system is embodied at a user terminal, the content identifier is delivered to a content locator of the device.

According to another example, there is provided a method of selecting content items to be delivered to a user of a content recommendation computer system, the user having at least one predetermined characteristic, the method comprising: receiving at the computer system social media updates from multiple consumers; using a social media analytic program component executing at the computer system to automatically analyse the social medial updates; using a grouping program component executing at the computer system to group the consumers according to the analysed social media updates into respective groups; storing in an electronic memory for each of the groups a set of group characteristics for that group; the computer system comparing the at least one predetermined characteristic of the user with the group characteristics to identify a group that shares the at least one predetermined characteristic and generating a recommendation comprising one or more selected content item for the user based on the identified group of consumers; and delivering a content identifier identifying the one or more content item to the consumer.

Thus, the recommendation engine ignores social medial updates from originators that do not share the at least one predetermined characteristic.

The recommendation engine can be configured by incorporating decision logic within code which is executed on a processor within the content delivery server. The decision logic within the recommendation engine uses social updates from similar users to the consumer for whom it is making the recommendation in order to make an assessment of what a user might like rather than looking at social media as a whole. In this context 'similar' is the group of consumers with the predetermined characteristic. For example, although a show like X Factor is extremely popular, not everyone likes it and so it is advantageous not to include updates from sources of social media, such as Twitter or Facebook that originate from X Factor or other originators who like X Factor, when these originators do not share the at least one predetermined characteristic of the user for which the recommendations are being made.

The at least one input of the recommendation engine is connected to a source of social media such as Twitter or Facebook. The recommendation engine can receive inputs from other sources, including other social media sources or sources of a different type such as a newsfeed, YouTube, etc. Inputs from these sources can be provided to a data aggregator which provides an input to the recommendation engine.

The system can also include a source of user profile data which has profile information about the consumer for whom the recommendation is to be made, the profile information including characteristics.

The content delivery system can also include a context engine which receives context data defining the context of a consumer and supplies that to the recommendation engine for use in recommending content items.

The at least one predetermined characteristic could be a combined group characteristic of the type described in GB 1402534.0 ("Crowd Based Content").

In an alternative embodiment, social updates can be filtered using a filtering component which is configured to receive current consumer profile information comprising personal data associated with the current consumer and to filter the social updates based on the current consumer profile information. This is a similar technique to that which is described in U.S. Ser. No. 14/179,704.

BRIEF DESCRIPTION OF THE FIGURES

Reference is made by way of example, to.

DESCRIPTION OF THE PREFERRED EMBODIMENT

In the content delivery system described herein, the defining characteristic of each group are determined by a dynamic user grouping (DUG) component and this allows a user matching (UM) component to allocate recommendation system users to one or more groups.

A social media analyser (SMA) analyses social media updates. Content consumption habits exhibited by members of a group can be assumed to be shared by other members of the group. So if the SMA/DUG identify a group of public users on social media and pick out, for example, a shared trait such as an affinity for news stories about Obama, the Economy and the Democratic Party, then these preferences will be used to weight results calculated by a recommendation component in the system when generating recommendations.

In known recommendation systems, this weighting is performed based on what it knows about the individual user or about how the individual user compares with other recommendation system users. But this is inherently limited. The intelligence available to such a system is derived purely from its own users making responses to its own finite range of content. The descriptions of each such item of content are further limited by the ways in which they have been tagged, categorised and described.

The approach described herein frees the recommendation system from these limitations by giving it a richer source of weighting information than it would be otherwise unable to determine. While the following description describes context-based recommendations, it will be appreciated that embodiments are broadly applicable to any recommendation system.

An exemplary content delivery system in which embodiments may be utilised is now described.

Figure 1:
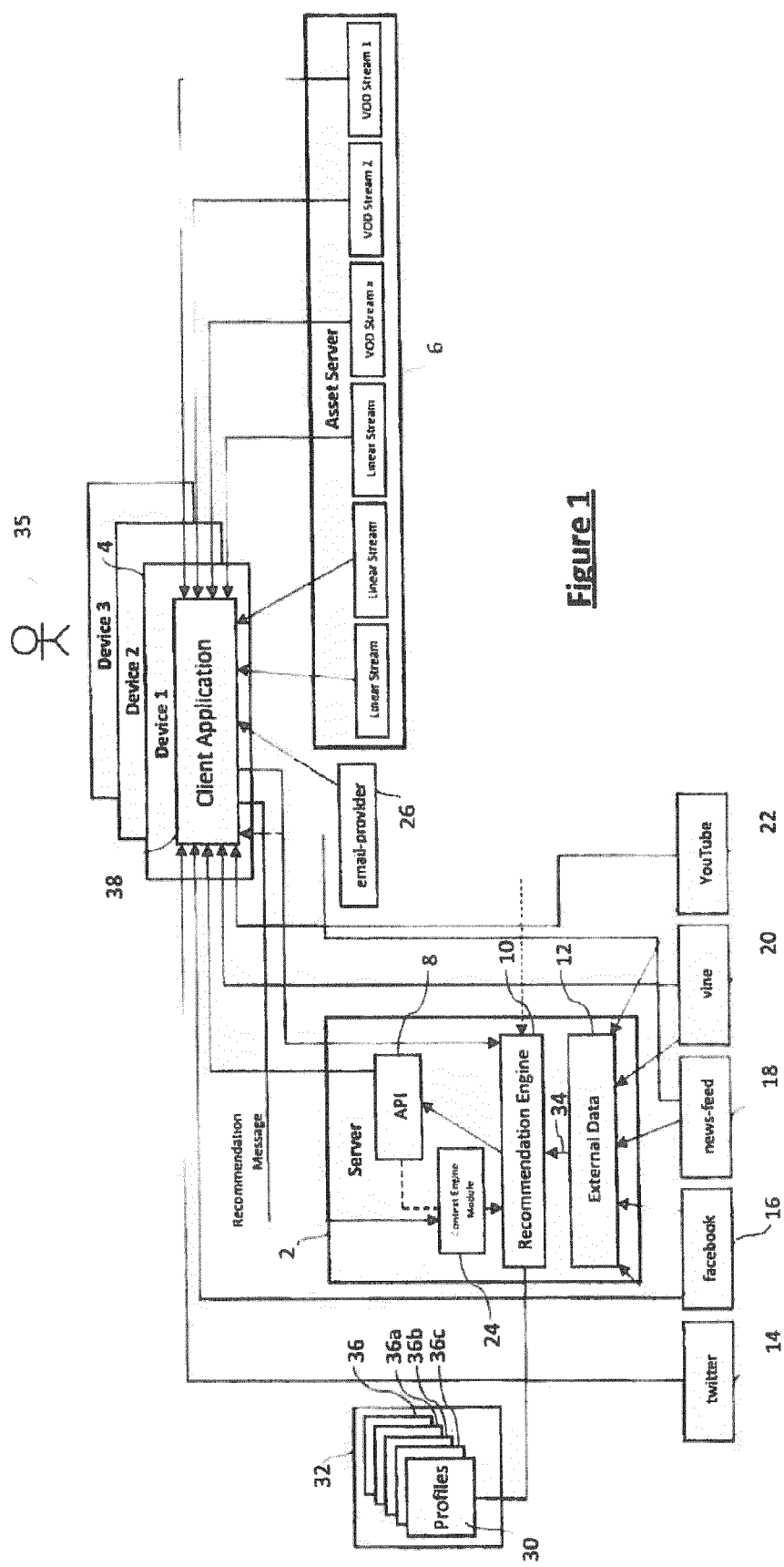
FIG. 1 which is a drawing of the architecture of a content delivery system.

FIG. 1 is a schematic architecture of a high level design of a content delivery system. A control server 2 is connected to a user terminal 4 by any suitable communication network, whether wired or wireless. The network is not shown in FIG. 1 for reasons of clarity. The user terminal 4 is also in communication with an asset server 6 via a same or different network. The asset server supplies video assets which can be linear stream assets or VOD assets. The user terminal 4 requests assets from the asset server 6 based on information which it receives from the control server 2. The control server 2 comprises an API (for example a REST API) 8, a recommendation engine 10, data aggregator 12 and a context engine module 24. The recommendation engine data aggregator and context engine module are all implemented by a suitably programmed processor or processors (not shown). The data aggregator is connected to a number of sources external to the control server 2, again by any suitable communication network. In this example, these sources comprise a Twitter feed 14 and a Facebook feed 16 (referred to herein as social media sources which generate social media updates), a newsfeed 18, a Vine feed 20 and a YouTube feed 22. These are exemplary only and it will readily be appreciated that other sources may be appropriate. The control server has access to user profiles 30, either in a local memory (not shown) or in a storage facility 32 accessible to the server. The data aggregator 12 receives information from these multiple sources and monitors their content so as to be able to supply content based information 34 to the recommendation engine 10. The recommendation engine 10 operates based on the content-based information supplied by the data aggregator 12, context data, user profile data and social media grouping data to recommend content items to a consumer at a user terminal. The content items can be video assets which can be accessed at the asset server 6 or content from the sources themselves. Thus the recommendation engine 10 has information about all assets available in the asset server 6 and operates to recommend assets based on the content-based information 34 it receives from the data aggregator 12. A context engine 24 collects context data and supplies it to the recommendation engine as described in the "Context Based Recommendation" applications.

The user terminal 4 is labelled "Device 1". A user 35 may own multiple devices, which are indicated in FIG. 1 by the labelling Device 2, Device 3. Each of these devices is a user terminal. For example, a user 35 might own a tablet, a smartphone, and a laptop and a TV set. He may be using one or more devices at any particular time. In one particular use case mentioned later, he may for example, be using a smartphone (Device 1) and a TV set (Device 2), with the smartphone acting as a companion to the TV set. In any event, all the devices are capable of communicating with the server when they are active and logged on by the user. In FIG. 1, connections are shown between the user terminal 4 and the server 2. In particular, the user terminal 4 feeds data back to the context engine 24 and the recommendation engine 10. In addition, the devices can communicate with the asset server to obtain assets from the asset server.

In some embodiments, the system is capable of delivering content recommendations based on the type of device that a user is currently logged in to.

The user 35 has a profile 36 in the user profile 30. In this user profile are stored preferences and other information about the user 35 to allow recommendations to be made based on information personal to that user. In the present system, the user can set up individual sub-profiles, 36a, 36b, 36c, etc. which allow him to have different preferences in different situations that he may find himself in. This means that recommendations based on the user sub-profiles cold vary even for the same user when that user is in different settings. It will readily be appreciated that a single user is being discussed, but in practice the system operates with a large number of different users, where all users have profiles and sub-profiles set up for them respectively. Only a single profile and its sub-profiles is shown in FIG. 1 for the sake of convenience.

In addition to providing recommendations based on device type, the system provides recommendations based on other context parameters, as described in the "Context Based Recommendation" applications incorporated herein by reference, and in the sister case filed on even date with this case with the short title "Context Vector"; PWF Ref: U.S. Pat. No. 335,710, claiming priority from U.S. 62/033,445.

In an embodiment, the recommendation engine includes decision logic which only uses social updates from similar users (that is, users sharing at least one predetermined characteristic with the current consuming user) to make an assessment of what the user might like rather than looking at social media as a whole. To achieve this, in one embodiment, the recommendation engine is configured to recognise identifiers of originating sources within the social media feeds, whereby the identifiers indicate the characteristics of the originators. It will be evident that each social media feed comes from a particular originator, and that originator is associated with an identifier. The identifier can include information about the characteristics of the originator.

The recommendation engine can check if the originator shares at least one predetermined characteristic with the current consuming user (for example, by checking the profile data of the user) before allowing that particular update to influence the content recommendation.

The context engine module 24 influences the recommendation engine so that the recommendations are based on the context of a user. The context of a user is perceived here to govern the behaviour of a user and therefore to affect their likely preferences for engaging with content. The likely context based preferences for a user can be determined by monitoring historical behaviour of a user, or can default to certain conditions based on information about the user, for example, in his user profile. A user can set or override context parameters associated with the context engine module should they wish to do so. The context engine module 24 also influences the recommendation engine to define the number n and type of assets to be recommended to a user, based on context.

The user device 4 executes a client application 38 which cooperates with the context engine 24 to deliver context based recommendation.

The content delivery system is capable of compiling video snippets based on various context parameters including: location, time (possibly short-form in the day and long-form in the evening), device (flat screen TV, laptop, mobile device), available time (that is, the time available to a user to engage with particular content. The terms short-form and long-form define different types of assets—other types of content include news articles, linear news, social content. As mentioned above, different types of assets can be stored in the asset server 6, or available from the multiple sources 14 to 22. In addition, other assets can be available from different sources (not shown), for example, static news articles. Herein, the term "content" refers to any type of displayed images or text to a user; a content item is a piece of content. The term "asset" is used herein to denote video assets and also other types of content items without limitation.

The content, type and number of the recommended assets/content items varies with context, and is based on updates from at least one social media feed sharing characteristics with the consumer.

Figure 2:
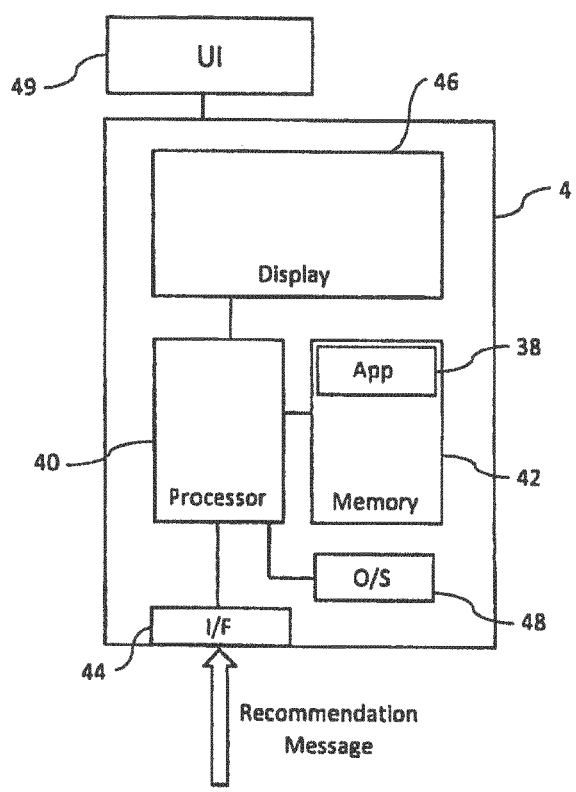
FIG. 2 which shows a user terminal.

FIG. 2 is a schematic block diagram of a user terminal 4. The user terminal 4 comprises a processor 40 and a memory 42. The client application 38 is stored in the memory 42 and is executed by the processor 40. The user terminal 4 also has an interface 44 and a display 46. The display is controlled by the processor 40. As will be evident from the following, instructions received from the server in a recommendation message by the interface 44 are used by the processor to control the display 46. Although one processor is shown, it will be evident that the display could in fact be controlled by a dedicated graphics card or dedicated driver responsive to the instructions received from the server. The user terminal 4 has its own operating system 48. When delivering content of different types to a display 46 of a known computer device, such as a smartphone or tablet, it is the operating system which is generally responsible for aggregating different types of content and driving the display to display those different types of content. In the present system however it is the app which is executed by the processor 40 and which is responsive to instructions in the recommendation message from the server which controls the display and allows the display to show different types of assets. Thus, the application can be delivered to different kinds of devices running different kinds of operating systems (for example, android, IOS, etc.). Thus, a similar experience can be delivered to users even if they are using different device types. Moreover, it is the server itself which manages the layout of the display for a particular device and the content recommendations for a particular user, so that the particular OS which is being executed by the device to support the basic operations of the device does not affect the system. Moreover, the server can deliver a recommendation message to any user terminal executing the app 38 regardless of its operating system.

Figure 3:
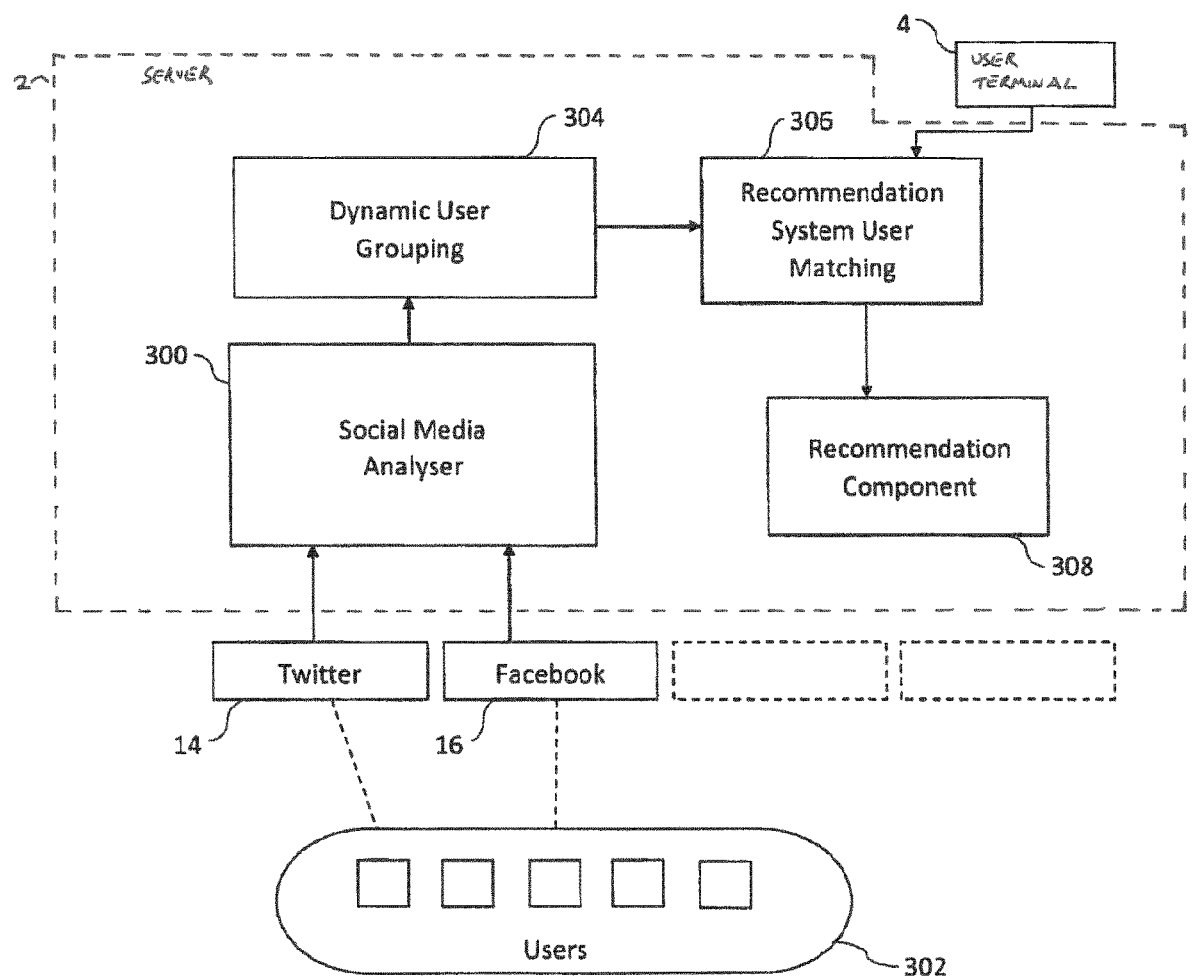
FIG. 3 which shows an embodiment of a social media usage system to guide recommendations.

FIG. 3 shows part of an exemplary social trend monitoring system. The social trend monitoring system may be implemented on the server 2 of the arrangement of FIG. 1. For the purpose of explanation, the social trend monitoring system is illustrated as being implemented as distinct functional blocks within the server 2, but one skilled in the art will appreciate that the illustrated and described functional blocks may be implemented as part of existing functional blocks of the server as shown in FIG. 2.

FIG. 3 illustrates multiple sources of content for the server, such as the twitter source 14 of FIG. 1 or the Facebook source of FIG. 1. As additionally shown in FIG. 3 each of these sources is connected to various users, with users generally being denoted by reference numeral 302 in FIG. 3.

Also shown in FIG. 3 is the user terminal 4 connected to the server 2.

The social trend monitoring system, which may be implemented on the server 2, comprises a number of parts: a social media analyser module 300; a dynamic user grouping module 304; a recommendation system user matching module 306; and a recommendation component 308.

The social media analyser (SMA) module 300 is connected to the various sources of content, such as the twitter source 14 and the Facebook source 16. The social media analyser 300 monitors social media continuously based on these connections. This is shown as Twitter and Facebook, but could be some or all of any sources such as Instagram or Google.

The SMA 300 might have what is called "firehose" access to a social network which means it receives a copy of *every* message posted to that social network; or it might have limited access where it receives messages that conform to a broad set of selection criteria (e.g. all messages on Facebook on a set of Facebook Pages, or all tweets with the hashtag #movies etc. . . . ). Any filtering would be carried out external to the SMA 300. THE SMA 300 may receive every social media update or just some. However the messages are delivered, the point is the SMA 300 receives a large number of messages from a large group of users 302. In general the SMA 300 receive social media communications, which may be social media updates.

Most of these social media consumers may not be users of the recommendation system associated with the server 2. They do however represent a snapshot of what the general public are talking about on social media.

From this vast collection of messages entering the SMA 300 at any one time, the following four exemplify the kind of content it receives:

@david1234 "really liking #xfactor tonight"
@janedoe1 "i've decided that matt damon isn't very good in sci-fi movies"
@edwood "what's that tv show with John Cleese in it called?"
@marlon "hello I'm new to twitter"

It does not matter if these users are users of the recommendation system or not. The messages are analysed for audience intelligence.

@david1234
Watches X-Factor
Watches TV Shows
Watches TV in the evening, if his message is geotagged we can estimate roughly where he lives
Feels positively about X-Factor
@janedoe1
Probably likes Matt Damon films usually
Probably likes Sci-Fi usually
Doesn't like movies with Matt Damon in the SciFi genre
Negative sentiment
@edwood
Watches TV Shows
Probably likes John Cleese
Is positive about receiving content recommendations
@marlon
This message contains no relevant information, so it can be discarded.

All of this information can be deduced from these messages, and the metadata that Twitter, Facebook, of other content source provides with the message (e.g. location data) can be derived using standard semantic analysis of the message.

The metadata provided with messages tells a lot about each user: their country of origin; their approximate location (sometimes); how many followers or friends they have (and therefore how influential their comments are); gender; age; etc. . . .

Users can be considered similar if they are the same age/gender and from the same country, but this is only one (crude) way of assessing similarly.

For those users publishing messages on social media that the SMA 300 deems are relevant to the content it knows about (e.g. movies, TV shows, news, cat videos etc. . . . ) it is further able to look at that user's history of posts. From this information it can compile a more detailed view of who they are.

In the examples above, having seen a relevant message from @david1234, a deeper analysis of other posts would reveal details of other interests. For instance: a user may often comment on political stories from a specific news source (e.g. the Daily Mail); retweet JustGiving requests from friends, and might follow a large number of 90s pop-group accounts.

The SMA 300 can thus build up a detailed view of users who have made a contribution to a social media source which has been identified by the SMA 300 as of relevance to a recommendation engine with which they are associated.

The SMA 300 may be entirely unaware of its role within a recommendation system. The function of the SMA 300 is purely to identify characteristic of groups into which social media consumers can be placed. The majority of these consumers are not users of the recommendation system, although a small number are.

The benefit is that with a greater number of samples from the consumers as a while, and not just the consumers who are users of the recommendation system, it is possible to discern patterns into which the behaviour of a user of the recommendation system fall more easily.

For example, it is easier to spot peaks or patterns that allows a consumer sample to be separated into distinct groups in order to better inform a the parameters used by the recommendation system if the analysis is expanded to all consumers rather than just those which are users of the recommendation system.

THE SMA 300 analyses social media in order to learn more about the users of the recommendation system. As updates pasted by those user's alone is insufficient to be able to discern useful patterns, the behaviour of all consumers monitored.

The SMA 300 is used so that groupings can be made based on overall consumer activity, and the recommendation system users can be fitted into those groups as they emerge, develop and unfold.

Groups are transient or dynamic, and the SMA 300 picks out the characteristics that are shared by enough people to make them useful to describe a group at any given instant.

Thus, the SMA 300 generates social media information for all consumers, not just users of the recommendation system.

The dynamic user grouping (DUG) module 304 is connected to the SMA 300. While the SMA 300 is collecting and analysing social media updates and further analysing the users whose posts are relevant, to build up such a detailed view, the DUG module 304 looks for ways to group those users together.

Note as above that at this point these users are not necessarily recommendation system users: they can be members of the general public whose social media updates are publicly available.

There are many well known clustering algorithms designed to identify ways in which entities are related to each other. What is proposed here is not a new cluster algorithm, but rather a use of them.

The output of the dynamic user grouping service provided by the DUG module is a collection of group definitions and the properties shared by those groups. For example, there might be two groups:

Group A: 18-25 yo; Male; UK; Peak number of updates posted between 6 pm-10 pm on weekdays; messages normally positive disposition; positive on TV-shows; negative on current affairs; large number of friends/followers; messages posted typically get liked/retweeted 0-3 times; 0-1 replies; watches talent shows, action movies, but no news.

Group B: 22-26 yo; Male; UK; Peak number of updates posted between 4 pm 11 pm on weekends; messages normally negative disposition; positive on sports; negative on transport issues; small number of friends/followers but all active repliers and likers.

As can be seen, the groups are not mutually exclusive but instead describe collections of properties into which it is possible to group more than a background noise level of users.

All of the information and intelligence gathered by SMA module 300 and the DUG module 304 is then input material for a recommendation system user matching module 306.

Armed with the information about the wider audience provided by the SMA module 304 and the DUG module 304, the recommendation system user matching module 306 is used to apply it to the actual users 35 of the recommendation system.

This is begun by matching each recommendation engine user 35 against the list of groups identified by the DUG module 304. We can analyse trends in our own user's social media habits as well as the statistics we have about media they have watched and liked or disliked through our own system to determine how best they fit in any particular group.

An example user is 24 yo, he's a man, likes TV Shows. It's a Monday evening. We therefore slot him into Group A from the groups identified above. In reality a user would have varying degrees of match with a number of groups, and the recommendation system user matching would use the top matching groups to make its determination.

Note that this matching process would not always yield the same answer. If this process was run again at the weekend we would have a better match with Group B.

In any event, having identified one or more groups with which the user, in their current context, has a high degree of affinity, the recommendation engine 10 can be enhanced.

Thus the recommendation system user matching module operates to allocate user's of the recommendation system to groups defined by the DUG 304 based on the data produced by the SMA 300.

Having placed the example user into one or more groups of similar users, we can begin to make assumptions about other things the example user of the recommendation system might like (or dislike) based on what other users (who may not be users of the recommendation system) in that defined group have consumed or are consuming. These assumptions are used to weight recommendations.

For a Group A match, in the example, we might then pick out any action movies the user has not seen, or any talent shows that are currently airing, but we might drop Panorama and any other news-oriented programme.

The system uses historical social media data to calculate trends, groups and preferences of those groups to be able to fill in intelligence about a recommendation system user that might not be known explicitly to the recommendation system.

As such a user experiences these recommendations. Those to which they respond positively would reinforce their membership of those groups as a natural consequence of how they were matched with those groups originally.

Those recommendations they did not like would, by the same process, reduce the chances of them being so categorised next time.

The quality of recommendations are therefore improved by both mechanisms.

The recommendation module 308 and the recommendation user matching module 306 may form part of the recommendation engine of FIG. 1. Alternatively, the recommendation user matching module 306 can be a separate component providing an input to the recommendation engine 10.

In summary the SMA 300 provides the analysis of monitored social media communications. The DUG 304 then dynamically sets out the consumers providing those social media communications into groups. Further, the DUG 304 associates a user of the recommendation system with a currently defined group, and takes further the analysis provided by the SMA about what that group is discussing or talking about in their social media communications. The DUG 304 pushes this information into the recommendation system to be included in recommendations for the user.

Embodiments are not dependent on the context of a user of the recommendation system. However context may be one factor which is taken into account in determining which dynamic group a user is instantaneously associated with.

Embodiments have been described by way of reference to various examples to help in understanding. Embodiments are not limited to the detail of any example unless such detail is presented as essential by inclusion in an independent claim. All details of all embodiments may be combined either selectively or as a whole, and any embodiment does not exclude any combination nor is any embodiment limited to any combination unless such combination is presented as essential by inclusion in an independent claim.

Embodiments may be implemented in an apparatus, a method, or computer program code.

The apparatus may be a user device, or a server to which a user device is connected, or a system comprising a user device and a server. Each apparatus may include, at least, a processor and a memory and generally be implemented in a user device, or a server to which a user device is connected, or both a user device and a server.

The method may be a computer program. A computer program may be a computer program or executable code which, when run or executed on an apparatus, performs the method. The computer program or executable code may be run on the user device, or the server, or both the user device and the server.

The computer program may be stored on a memory, and may be stored across multiple memories. The memory may be a memory of a functional device, or may be a specific memory storage apparatus such as a memory disk or memory stick. The memory may be a memory available on a network, such as a memory area available in a network such as an area of a so-called 'cloud'.

Aspects of the embodiments described herein include any or all of the described features used in any combination. In addition, methods, and computer programs for implementing the method, are contemplated.

The invention claimed is:

1. A content delivery system arranged to recommend content items to a user of the content delivery system having at least one predetermined characteristic, the content delivery system comprising:

a social media analyser stored in a memory of the system and implemented by a processor, the social media analyser configured to receive and analyse social media communications from multiple consumers including users of the content delivery system and non-users of the content delivery system;

a dynamic grouping component stored in the memory of the system and implemented by the processor, the dynamic grouping component configured to dynamically group at least some of the consumers, including the non-users of the content delivery system, according to the analysed social media communications, into dynamically created respective groups;

a user matching module stored in the memory of the system and implemented by the processor, the user matching module configured to receive the at least one predetermined characteristic of the user of the content delivery system, compare it with group characteristics of the respective groups to identify a group that shares the at least one predetermined characteristic, and allocate the user of the content delivery system to one or more of the respective groups, wherein the allocating process at one time instant yields different results to the allocating process at a different time instant; and a recommendation engine stored in the memory of the system and implemented by the processor, the recommendation engine configured to generate a recommendation of one or more selected content items for the user of the content delivery system based on the one or more respective dynamic groups to which the user of the content delivery system is instantaneously allocated, whereby the recommendation for the user of the content delivery system is based on social media communications of multiple consumers including non-users of the content delivery system; and an interface for delivering the recommendation to the user of the content delivery system.

2. The content delivery computer system of claim 1 wherein the dynamic grouping component groups all the consumers including non-users of the content delivery system associated with determined relevant social media communications.

3. The content delivery computer system of claim 1 wherein the dynamic grouping component is configured to group the at least some of the consumers including non-users of the content delivery system in dependence on an analysis of message content associated with their social media communications.

4. The content delivery computer system of claim 1 wherein the dynamic grouping component is configured to group the at least some of the consumers including non-users of the content delivery system in dependence on an analysis of their profile information.

5. The content delivery computer system of claim 1 wherein the dynamic grouping component is configured to group the at least some of the consumers including non-users of the content delivery system in dependence on an analysis of metadata associated with their social media communications.

6. A server comprising the content delivery computer system of claim 1.

7. The server of claim 6 wherein the interface is a network interface for connecting the server to a network which is in communication with a user terminal.

8. The content delivery computer system of claim 1 wherein, responsive to the user of the content delivery system responding positively to a recommendation, the allocation of the user of the content delivery system to the respective group is reinforced.

9. The content delivery computer system of claim 1 wherein the user matching module is further configured to allocate the user of the content delivery system to one or more of the respective groups further in dependence on the context of the user of the content delivery system.

10. The content delivery computer system of claim 1 wherein the non-users of the content delivery system include members of the general public whose social media updates are publicly available.

11. A method of selecting content items to be delivered to a user of a content delivery system, the user having at least one predetermined characteristic, the method comprising:
receiving at the computer system social media communications from multiple consumers, the multiple consumers including users of the content delivery system and non-users of the content delivery system;
using a social media analytic program component executing at the computer system to automatically analyse the social media communications;
using a dynamic grouping program component executing at the computer system to dynamically group at least some of the consumers, including the non-users of the content delivery system, according to the analysed social media communications into respective groups;
storing in an electronic memory for each of the groups a set of group characteristics for that group;
comparing the at least one predetermined characteristic of the user of the content delivery system with the group characteristics to identify a group of consumers that shares the at least one predetermined characteristic;
allocating the user of the content delivery system to one or more of the respective groups, wherein allocating at one time instant yields different results to allocating at a different time instant;
generating a recommendation comprising one or more selected content items for the user of the content delivery system based on the one or more of the respective groups to which the user of the content delivery system is instantaneously allocated, whereby the recommendation for the user of the content delivery system is based on social media communications of the non-users of the content delivery system; and
delivering a content identifier identifying the one or more content items to the user of the content delivery system.

12. The method of claim 11, further comprising:
dynamically grouping all the consumers associated with determined relevant social media communications.

13. The method of claim 11, further comprising:
dynamically grouping at least some of the consumers in dependence on an analysis of message content associated with their social media communications.

14. The method of claim 11, further comprising:
dynamically grouping at least some of the consumers in dependence on an analysis of their profile information.

15. The method of claim 11, further comprising:
dynamically grouping at least some of the consumers in dependence on an analysis of metadata associated with their social media communications.

16. A computer program product embodied on a non-transitory computer-readable medium and configured so as when executed on a processor to perform the method of claim 11.

17. A computer program embodied on a non-transitory computer-readable medium and, when executed on a processor, performs the method of claim 11.

18. The method of claim 11 wherein, responsive to the user of the content delivery system responding positively to a recommendation, reinforcing the allocation of the user of the content delivery system to the respective group.

19. The method of claim 11 further comprising allocating the user of the content delivery system to one or more of the respective groups further in dependence on the context of the user of the content delivery system.

20. The method of claim 11 wherein the non-users of the content delivery system include members of the general public whose social media updates are publicly available.

* * * * *